Figure 1:
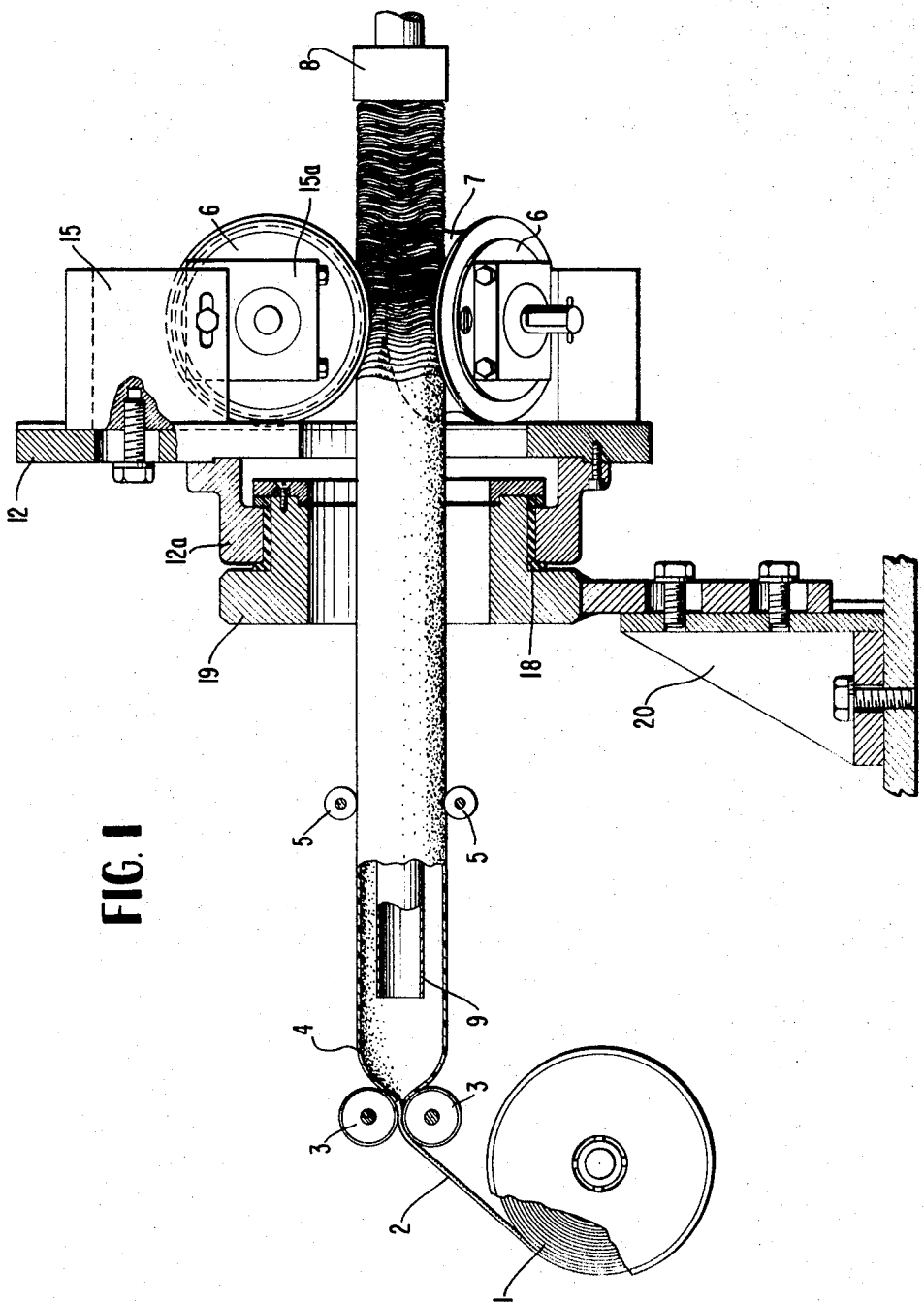

United States Patent

[11] 3,594,857

| [72] | Inventor | Horst Michl<br>Wallau uber Wiesbaden, Germany |
|---|---|---|
| [21] | Appl. No. | 787,070 |
| [22] | Filed | Dec. 26, 1968 |
| [45] | Patented | July 27, 1971 |
| [73] | Assignee | Kalle Aktiengesellschaft<br>Wiesbaden-Biebrich, Germany |
| [32] | Priority | Dec. 27, 1967 |
| [33] | | Germany |
| [31] | | P 16 32 113.4 |

[54] PROCESS AND APPARATUS FOR SHIRRING SAUSAGE CASINGS
9 Claims, 3 Drawing Figs.

[52] U.S. Cl. .................................................... 17/42, 17/49

[51] Int. Cl. .................................................... A22c 13/00
[50] Field of Search .................................... 17/42, 41, 45, 49; 99/176

[56] References Cited
UNITED STATES PATENTS

| 2,983,949 | 5/1961 | Matecki | 17/42 |
| 3,231,932 | 2/1966 | Michl | 17/42 |

*Primary Examiner*—Hugh R. Chamblee
*Attorney*—Bryan and Butrum

ABSTRACT: This invention relates to a process and apparatus for shirring a sausage casing, which process comprises slipping the casing over a mandrel while maintaining an internal gas pressure in the casing, and compressing the casing against a stop with the formation of pleats, the compressive force being applied to the casing from a plurality of zones rotating to and fro about the mandrel.

INVENTOR
HORST MICHL

INVENTOR
HORST MICHL
BY
Bryan and Bitrinac
ATTORNEYS

PROCESS AND APPARATUS FOR SHIRRING SAUSAGE CASINGS

This invention relates to a process for shirring artificial sausage casings, particularly those of regenerated cellulose, and to an apparatus for performing the process.

It is known to compress artificial sausage casings in the longitudinal direction thereof with the formation of pleats. This is done in order to be able to apply long length sections of a sausage casing in a simple manner to a stuffing horn through which sausage meat is to be forced into the casing. In the processes used in practice for shirring artificial sausage casings, the casings are slipped onto a mandrel while maintaining an internal gas pressure, the slipping-on being terminated by compressing the casing against a stop or abutment so that it is longitudinally shirred with the formation of pleats. For maintaining the internal gas pressure, the gas is generally blown through the mandrel over which the sausage casing is slipped and upon which it is shirred. For reasons of economics, the gas employed is air. The outer diameter of the mandrel is somewhat larger than that of the stuffing horn to be used later for filling the sausage casing, so that the shirred sausage casing can be mounted onto the stuffing horn. The sections of sausage casing shirred according to the known processes, often referred to as "sticks," possess a remarkably high interior cohesion. This is a very desirable property because it prevents the shirred pleats of the casing from separating when the sticks are handled.

According to copending application Ser. No. 671,866, filed Sept. 29, 1967, sticks of shirred sausage casings having an even better internal cohesion may be produced by imparting a to and fro rotating motion to the mandrel about its axis in relation to a sausage casing being slipped thereon. It particularly has been suggested to cause the force resulting in the shirring effect on the sausage casing to act simultaneously and continuously at opposite locations on the sausage casing and to employ the to and fro rotation of the mandrel as an additional process step in the processes described in U.S. Pat. Nos. 3,142,861 and 3,231,932. In the processes of the foregoing patents, the force causing compression with the formation of pleats, i.e. the force causing the shirring effect on the sausage casing, is transferred from two or more wheels having grooved rims to the sausage casing so that the force acts simultaneously and continuously at opposite locations on the sausage casing.

The foregoing process causes a considerable improvement in the resistance to bending of the resulting stick of shirred sausage casing. Apparently, this is due to the fact that the casing is jammed onto the mandrel by the shirring process so that, when the mandrel rotates to and fro the already shirred portion of the casing is caused to participate in this rotational movement, thus preventing the formation of longitudinal zones of reduced internal cohesion in the stick of shirred casing.

The present invention achieves a still better distribution of the pleats formed and compressed during shirring of the sausage casing.

The process of the present invention is based upon the process for shirring artificial sausage casings by means of two or more wheels having grooved rims, as described in the copending application, supra, in which the sausage casing is passed under internal gas pressure over a mandrel which is rotating to and fro about its axis in relation to the sausage casing being passed thereover and the sausage casing is finally compressed against a stop or abutment with the formation of pleats. The force exerting compression with the formation of pleats is caused to act simultaneously and continuously at opposite locations on the sausage casing. In the process of the present invention, however, the wheels having grooved rims and continuously exerting the force for shirring the sausage casing are rotated to and fro, as a unit, about the axis of the mandrel, whereas the mandrel is stationary.

The process results in denser and more uniformly distributed shirred pleats than does the known process. This is particularly the case when, in the present process, the wheels having grooved rims are caused to engage the sausage casing obliquely to the axis of the mandrel.

The present invention also provides an apparatus having a stop at the one end of a hollow mandrel and a pair of squeeze rollers at the other end of the mandrel and, between the stop and the pair of squeeze rollers, two or more wheels having grooved rims and being uniformly positioned around the axis of the mandrel. In the apparatus according to the present invention, however, a pivoted frame is mounted centrally with respect to the axis of the mandrel, upon which frame the wheels are mounted, and includes a drive which causes the frame to perform a reciprocating rotational movement. The drive may cause the reciprocating rotational movement by means of an eccentric, for example.

In the present process, the number of to and fro rotations to be made by the wheels for achieving the most favorable results depends, inter alia, on the other process conditions; it can be relatively easily and quickly determined by tests. Generally, the larger the diameter of the sausage casing to be shirred, the smaller is the number of partial rotations. In most cases, the best results are achieved by causing the wheels to make 4 to 35 to and fro rotations while 1 m. of sausage casing is conveyed by the wheels. Each partial rotation extends over a range of 20° to 40°; this means a deviation of 10° to 20° from the central position to both sides. The partial rotations, however, may extend over a substantially greater range.

The apparatus of the invention is provided with two, three or more wheels which are uniformly positioned about the mandrel so that the periphery of the sausage casing is engaged thereby more uniformly. The wheels may be made, for example, of rubber or an elastic plastic material. Their rims are provided with grooves of uniform cross section. In cross section, the grooves of all the wheels are portions of a common circle which is somewhat smaller than the circle representing the cross section of the sausage casing to be shirred. The circle in cross section, indicated by the grooves of the wheels at the point of engagement with the sausage casing, is concentric with the axis of the mandrel. The force of the wheels acting upon the sausage casing for shirring with the formation of pleats may act parallel or at a small angle to the axis of the mandrel. In the latter case, the wheels are positioned correspondingly oblique to the axis of the mandrel.

The wheels mounted on the frame, as a unit, execute a to and fro rotational movement about the axis of the mandrel. This movement is caused, for example, by a motor having an adjustable speed driving through a crank assembly having an adjustable crank diameter. The amplitude as well as the frequency of the partial rotational movement are thus variable.

Figure 3:
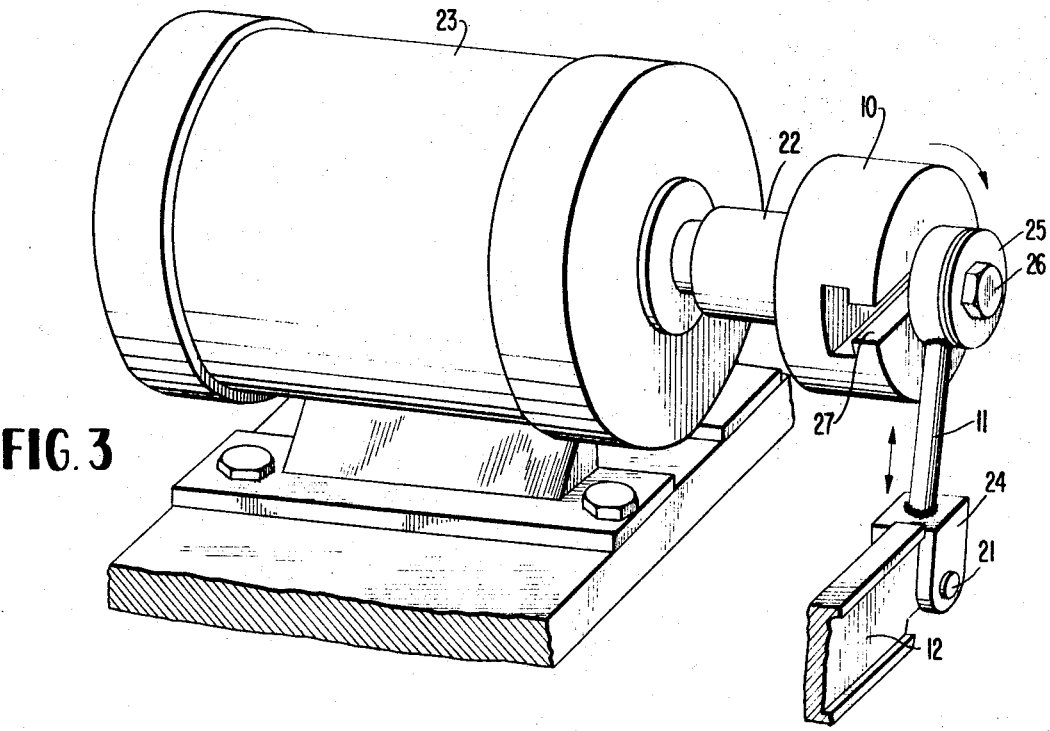
Figure 2:
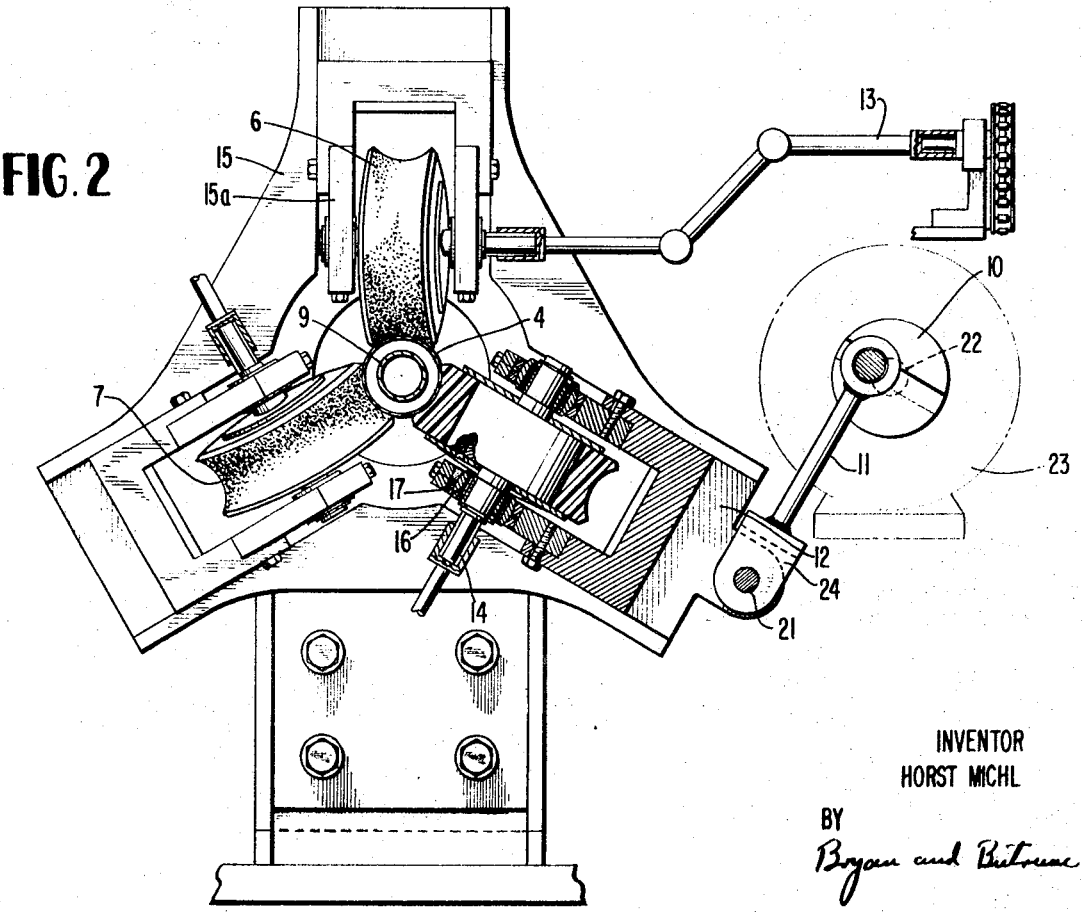

The process and the apparatus for performance thereof will be further illustrated by reference to the accompanying drawings in which;

FIG. 1 is a side elevation showing, in cross section, the essential parts of an apparatus in accordance with the invention, FIG. 2 is a cross-sectional view perpendicular to the direction of view of FIG. 1 and shows the arrangement of the wheels which are oblique with respect to the mandrel, and FIG. 3 is a view of the eccentric serving for the production and adjustment of the magnitude of the rotary movement.

In the apparatus shown in the figures, a sausage casing to be shirred is taken from the reel 1 on which the sausage casing is wound in the form of a flattened tube 2. This tube passes through a pair of squeeze rollers 3, whereupon it advances as the tube 4 inflated by a slight air pressure, passing first between the supporting rolls 5 which may be idlers or driven and then reaching the wheels 6. The rims of the wheels 6 are provided with the grooves 7. The wheels 6 are rotated by means of an electric motor, not shown, in a manner such that the inflated tube 4 is passed over the mandrel 9 until it is pressed, with the formation of pleats, against the stop 8 or against the quantity of shirred tube on the mandrel already accumulated in front of the stop.

For achieving a relatively high bending resistance of the resulting tubular stick, the tube 4 is continuously displaced, while being advanced, by a continuous to and fro rotational movement of the wheels 6 about the axis of the mandrel 9, which leads to a more uniform distribution of the formed pleats and thus to a better bending resistance of the stick. The to and fro rotational movement of the wheels is transferred from an eccentric 10, having an adjustable eccentricity, by means of a connecting rod to a frame 12 on which the wheels 6 are mounted.

The wheels 6 are driven, for example, by means of the jointed shafts 13 which are slipped over the axles 14 of the wheels 6 and are detachably connected therewith. For the purpose of clarity, FIG. 2 shows only one of the three jointed shafts 13. The wheels 6 are pivotally mounted in U-shaped bearing supports 15a having roller bearings 16 therein, which latter are mounted in adjusting bearings 17. By means of the latter it is possible to adjust the bearings 16 obliquely to the axis of the mandrel instead of adjusting them perpendicularly thereto. The deviation from the vertical adjustment may be 15°, for example. The bearing supports 15a are slidably mounted in the bearing brackets 15 so that the bearing supports 15a can be adapted to the oblique arrangement of the wheels 6 and the bearing brackets 15 are slidably mounted in the frame 12 so that the distance of the wheels 6 from the center of the mandrel 9 can be varied. The flange 12a which is connected with the frame 12 is pivotally mounted on the hollow shaft 19 which is carried by the supporting block 20. The connecting rod 11 is pivotally mounted on the frame 12 by means of the pin 21 and the bifurcated end 24.

The other end of the connecting rod 11 is connected by means of the eccentric 10 with the shaft 22 of an adjustable speed electric motor 23. In the eccentric 10, a sliding block 25 is clamped, by means of a screw 26, in a T-slot 27. Loosening the screw 26, displacing and further clamping the sliding block 25 in the slot 27 changes the eccentricity of the eccentric 10.

Changing the eccentricity and the rate of revolution of the eccentric 10 may change the amplitude and frequency of the to and fro rotational movement executed by the frame 12, and therewith by the wheels 6, and the desired process conditions with respect thereto thus may be adjusted.

The tubular sticks obtained by the above-described apparatus exhibit a pleat pattern which is different from the pleat patterns hitherto known. In the narrow zones not engaged by the grooves of the wheels, the pleats are particularly intimately interlaced. Since these zones of interlaced pleats are steadily displaced with respect to the periphery of the mandrel, a very intimately pleated tubular stick is pressed on the mandrel.

The apparatus according to the invention has the further advantage that it can be constructed more easily for machines for shirring sausage casings in which several mandrels having a turret arrangement are successively brought into working position with respect to the shirring wheels than apparatus in which the wheels are stationary and the mandrel is rotating to and fro.

It will be obvious to those skilled in the art that many modifications may be made within the scope of the present invention without departing from the spirit thereof, and the invention includes all such modifications.

What is claimed is:

1. A process for shirring a sausage casing which comprises slipping the casing over a mandrel while maintaining an internal gas pressure in the casing, and compressing the casing against a stop with the formation of pleats, the compressive force being applied to the casing from a plurality of zones rotating continuously in the direction towards the stop and also rotating to and fro as a unit about the mandrel.

2. A process according to claim 1 in which the compressive force acts at three equally spaced points on the periphery of the sausage casing.

3. A process according to claim 1 in which the mandrel is stationary.

4. An apparatus for shirring a sausage casing which comprises a mandrel, means for maintaining an internal gas pressure in a casing on the mandrel, a plurality of wheel means rotatable in one direction longitudinally of the mandrel for compressing the casing against a stop with the formation of pleats, the wheel means being uniformly spaced around the mandrel, and means for imparting a to and fro rotational movement to the wheels as a unit about the mandrel.

5. An apparatus according to claim 4 in which the mandrel is stationary.

6. An apparatus according to claim 4 in which the wheel means includes three wheels.

7. An apparatus according to claim 4 in which the to and fro rotational movement of the wheels is effected by eccentric means.

8. An apparatus according to claim 7 in which the eccentric means has a variable eccentricity.

9. An apparatus according to claim 4 in which the wheel means are mounted obliquely with respect to the mandrel.